United States Patent [19]
Phillips

[11] Patent Number: 4,515,051
[45] Date of Patent: May 7, 1985

[54] KNIFE BLOCK GUIDE

[75] Inventor: Michael J. Phillips, Milmont Park, Pa.

[73] Assignee: The Boeing Company, Seattle, Wash.

[21] Appl. No.: 534,921

[22] Filed: Sep. 22, 1983

[51] Int. Cl.³ .............................................. D06H 7/00
[52] U.S. Cl. .................................. 83/146; 83/168; 83/635; 83/824; 83/925 CC; 30/275
[58] Field of Search .......... 83/146, 168, 635, 925 CC, 83/821, 824; 30/392–394, 275

[56] References Cited
U.S. PATENT DOCUMENTS

| | | | |
|---|---|---|---|
| 1,375,989 | 4/1921 | Williams | 30/275 X |
| 1,958,912 | 5/1934 | Clark | 30/275 X |
| 3,273,612 | 9/1966 | Keddia | 83/824 |
| 3,572,202 | 3/1971 | Gerber et al. | 30/275 X |
| 3,830,122 | 8/1974 | Pearl | 83/925 CC X |
| 3,935,779 | 2/1976 | Hildebrandt | 83/821 X |
| 4,436,013 | 3/1984 | Gerber | 30/275 X |

Primary Examiner—James M. Meister
Attorney, Agent, or Firm—Jones, Tullar & Cooper

[57] ABSTRACT

An improved cutting machine including a thin, elongated cutting blade and a guide block with an opening which is shaped to conform to the cross-sectional shape of the elongated cutting blade. The guide block with the defined opening both guides the elongated cutting blade and maintains it clean.

9 Claims, 5 Drawing Figures

4,515,051

KNIFE BLOCK GUIDE

BACKGROUND OF THE INVENTION

1. Field of the Invention

The present invention relates to a guide block for an automatically operated knife, and in particular to a guide block for use with a Gerber cutter.

2. Prior Art

A Gerber cutter, so-called because it is manufactured by Gerber Garment Technology, Inc., is a cutting machine, such as that disclosed in U.S. Pat. No. 4,091,701, for cutting fabric material. FIG. 1 shows the cutting blade 10 and associated mounting structure of the Gerber cutter disclosed in the noted patent. The cutting blade 10 is driven by a reciprocating drive linkage 12. The cutting blade 10 passes through a roller guide 14 mounted to a presser foot 16. The roller guide 14 includes a housing 18 which houses two sets of rollers 20,22 and 24,26, as well as a roller 28 (FIG. 2). The cutting blade passes through the two sets of rollers 20,22 and 24,26 and engages roller 28 with its flat rear surface.

The rollers 20,22; 24,26 and 28 serve to more accurately control the positioning of the blade during cutting.

SUMMARY OF THE INVENTION

The use of composite materials for constructing various shaped structural members is quite prevalent, especially in the aircraft industry. The composite materials typically, comprises resin impregnated material. The structural members, typically, have irregular shapes, and are initially formed by a layup of the composite material. Understandably, then, the composite material needs to be cut to the intended irregular shape of the structural member.

A Gerber cutter would be ideally suited for cutting the composite material. It has been found, however, that the blade and rollers accumulate resin and fiber. This accumulation causes the knife to bind or seize rendering the cutter inoperable.

An object of the present invention is to improve the Gerber cutter to cut resin impregnated type of material.

A related object of the present invention is to achieve the first stated object without sacrificing blade guidance which is important in proper cutting and avoiding blade damage.

To achieve these objects a replacement for the roller guide assembly is proposed which is mounted as is the roller guide assembly to the presser foot so that it can receive the cutting blade without requiring any changes in the cutter blade mounting. With the replacement proposed the cutting blade is guided as before and maintained free of resin accumulation when cutting resin impregnated type of material.

The replacement in the form of a unitary block includes an opening which is shaped to conform to the cross-sectional shape of the cutting blade.

DETAILED DESCRIPTION

According to the present invention, the roller guide 14 of the Gerber cutter is replaced with block 30, which is preferably fabricated as a unitary block made from a non-stick, durable, polymer based material, such as TEFLON or reinforced nylon.

Figure 3:
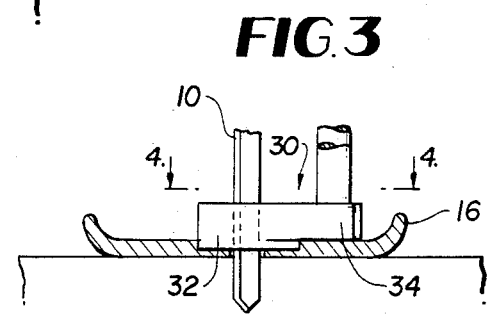
FIG. 3 is a partial cross-sectional view of the guide block according to a preferred embodiment of the present invention in assembly with the presser foot.

The actual configuration of the block 30 is arbitrary. The configuration shown in FIGS. 3 and 4 was chosen to fit the presser foot of the System 91 Gerber cutter. The block 30 as shown includes a circular body portion 32 from which a flange portion 34 extends. The body portion 32 has an opening 36 formed therein through which the elongated cutting blade 10 extends. The body portion 32 also had a threaded bore 38, while the flange portion 34 has two bores 40 and 42 which together with the bore 38 are used to mount the block 30 to the presser foot 16.

Figure 5:
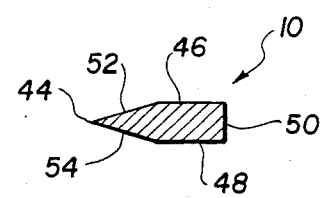
FIG. 5 is an enlarged view in cross-section of the cutting blade.

The elongated cutting blade 10 is shown in cross-section in FIG. 5 to include a sharp leading cutting edge 44, two parallel broad sides 46,48, a trailing edge 50 and two tapered edges 52,54 which converge to define the cutting edge 44 and extend to the broad sides 46,48.

Figure 4:
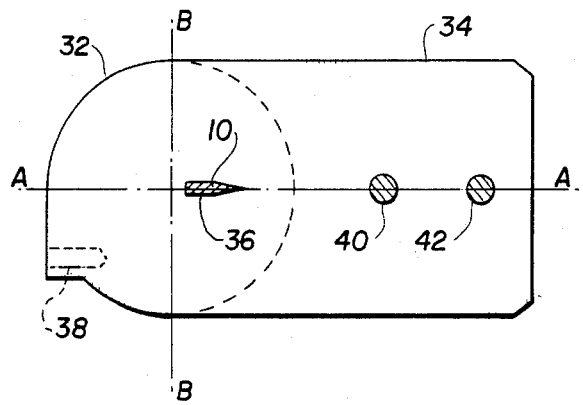
FIG. 4 is a top plane view of the guide block of FIG. 3.

An important feature of the present invention is to conform the shape of the opening 36 to the cross-sectional shape of the cutting blade 10 (see FIG. 4). Accordingly, the opening 36 defines a passage which includes surfaces which conform to sides 46,48 and edges 44, 50, 52 and 54 throughout the length of the passage.

Figure 1:
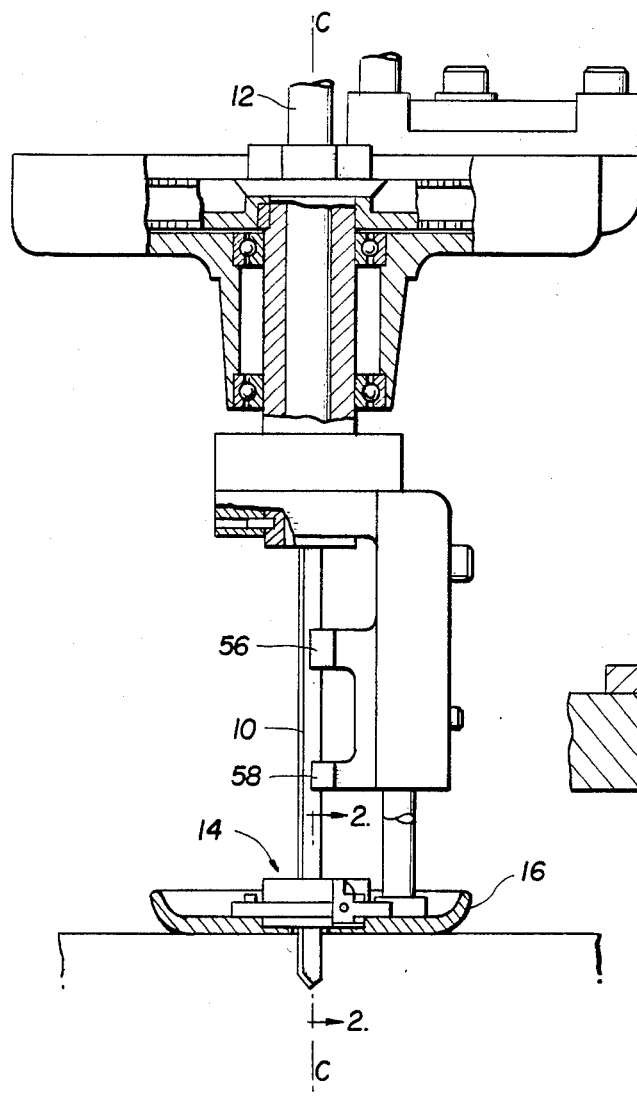
FIGS. 1-2 correspond to FIGS. 2 and 7, respectively of U.S. Pat. No. 4,091,701. As such they represent prior art, illustrating those aspects of the Gerber cutter sufficient for an understanding of the present invention.
Figure 2:
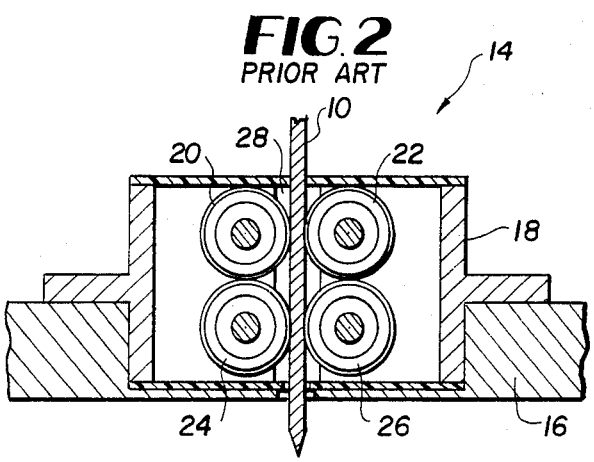

The opening 36 is therefore matched to the elongated cutting blade's dimensions to act as a wiper. The wiping action prevents resin migration up the blade. It also serves as a guide for lateral (axis A—A) and transverse (axis B—B) guidance of the blade 10. While the block 30 also serves a guide function for the blade 10, the principal guide function is carried out by the bifurcated friction guides 56 and 58 (FIG. 1), which are part of the known Gerber machine. Nevertheless, guidance in close proximity to the cutting operation is important to proper cutting and the block 30 serves that added function.

To enhance this guidance feature, the bores 40 and 42 are situated along axis A—A, while the bore 38 is transversely offset from axis A—A along a direction parallel to axis B—B so that any tendency for the block 30 to rotate about axis C—C of the cutting blade 10 (FIG. 1) is minimized, thus adding to the guidance feature of the block 30 by preventing the slight movements of the block 30 into the path of the cutting blade 10 which could damage the blade.

While the opening 36 provides support for the cutting blade 10, the dimensions of the opening are such that passage of the cutting blade 10 is permitted while resin and fiber passage is blocked. As noted, the opening 36 serves to wipe the cutting blade 10 by blocking passage of resin and fiber. Since the cutting blade 10 carries less resin, the upper guides 56 and 58 are also kept free of excessive resin build up.

The wiping or cleaning action of the polymer based solid block 30 is performed, therefore, by stripping the cutting blade 10 of excess resin and fiber, and to perform this stripping action the clearance between the cutting blade and the surfaces of the opening 36 is very small. The lubricity of the material from which the block 30 is made allows the cutting blade 10 to slide freely within the passage. Also, this natural lubricity keeps the heat build up from friction at a minimum.

Since resin impregnated material ia being cut, liquid coolant and/or lubrication cannot be used because it will contaminate the material being cut, and any such contamination will effect final part quality. The pre-impregnated material is later cured at an elevated temperature and pressure. Any contamination of the material, therefore, will hinder this process and destroy the structural integrity of the final part. The lubricity of the material used in fabricating the block 30 is therefore important.

The use of the block 30 for the roller guide 14 provides for operation of the cutter with less down time for guide cleaning. The simplicity of the block 30 provides fewer parts and a less complex assembly. It is also easier and less expensive to fabricate.

What is claimed is:

1. In a cutting machine including a thin, elongated cutting blade, and a foot positioned immediately above the material to be cut and through which the elongated cutting blade moves and extends into the material during a cutting operation, the improvement comprising:
   guide means for the cutting blade; and
   means for mounting the guide means to the foot,
   said guide means defining an opening through which the elongated cutting blade moves and by which the elongated cutting blade is guided both laterally and transversely of its elongated extent, and
   said opening being shaped to conform to the cross-sectional shape of the elongated cutting blade.

2. In the cutting machine as defined in claim 1, wherein the guide means comprises a unitary block made from a non-stick, durable, polymer based material.

3. In the cutting machine as defined in claim 2, wherein the means for mounting the guide means to the foot are located laterally and transversely relative to the elongated cutting blade.

4. In a cutting machine including a thin, elongated cutting blade which defines a sharp leading cutting edge, a straight trailing edge and two broad sides between the leading and trailing edges, and a foot positioned immediately above the material to be cut and through which the elongated cutting blade moves and extends into the material during a cutting operation, the improvement comprising:
   guide means for the cutting blade; and
   means for mounting the guide means to the foot,
   wherein said guide means defines an opening through which the elongated cutting blade moves and by which the elongated cutting blade is guided both laterally and transversely of its elongated extent, said opening defining a sharp leading edge, a straight trailing edge and two broad sides between the leading and trailing edges which are substantially coextensive with the corresponding edges and surfaces of the elongated cutting blade.

5. In the cutting machine as defined in claim 4, wherein the guide means comprises a unitary block made from a non-stick, durable, polymer based material.

6. In the cutting machine as defined in claim 5, wherein the means for mounting the guide means to the foot are located laterally and transversely relative to the elongated cutting blade.

7. In a cutting machine for cutting resin impregnated material, including a thin, elongated cutting blade which defines a sharp leading cutting edge, a straight trailing edge and two broad sides between the leading and trailing edges, and a foot positioned immediately above the material to be cut through which the elongated cutting blade moves and extends into the material during a cutting operation, the improvement comprising: p1 guide means for the cutting blade; and
   means for mounting the guide means to the foot,
   wherein said guide means defines an opening through which the elongated cutting blade moves and by which the elongated cutting blade is guided both laterally and transversely of its elongated extent, said opening defining a sharp leading edge, a straight trailing edge and two broad sides between the leading and trailing edges which are substantially coextensive with the corresponding edges and surfaces of the elongated cutting blade, and wherein the clearance between the cutting blade and the edges and sides of the opening is such that substantially all the resin is removed from the cutting blade as it passes through the opening.

8. In the cutting machine as defined in claim 7, wherein the guide means comprises a unitary block made from a non-stick, durable, polymer based material.

9. In the cutting machine as defined in claim 8, wherein the means for mounting the guiding means to the foot are located laterally and transversely relative to the elongated cutting blade.

* * * * *